Patented June 30, 1936

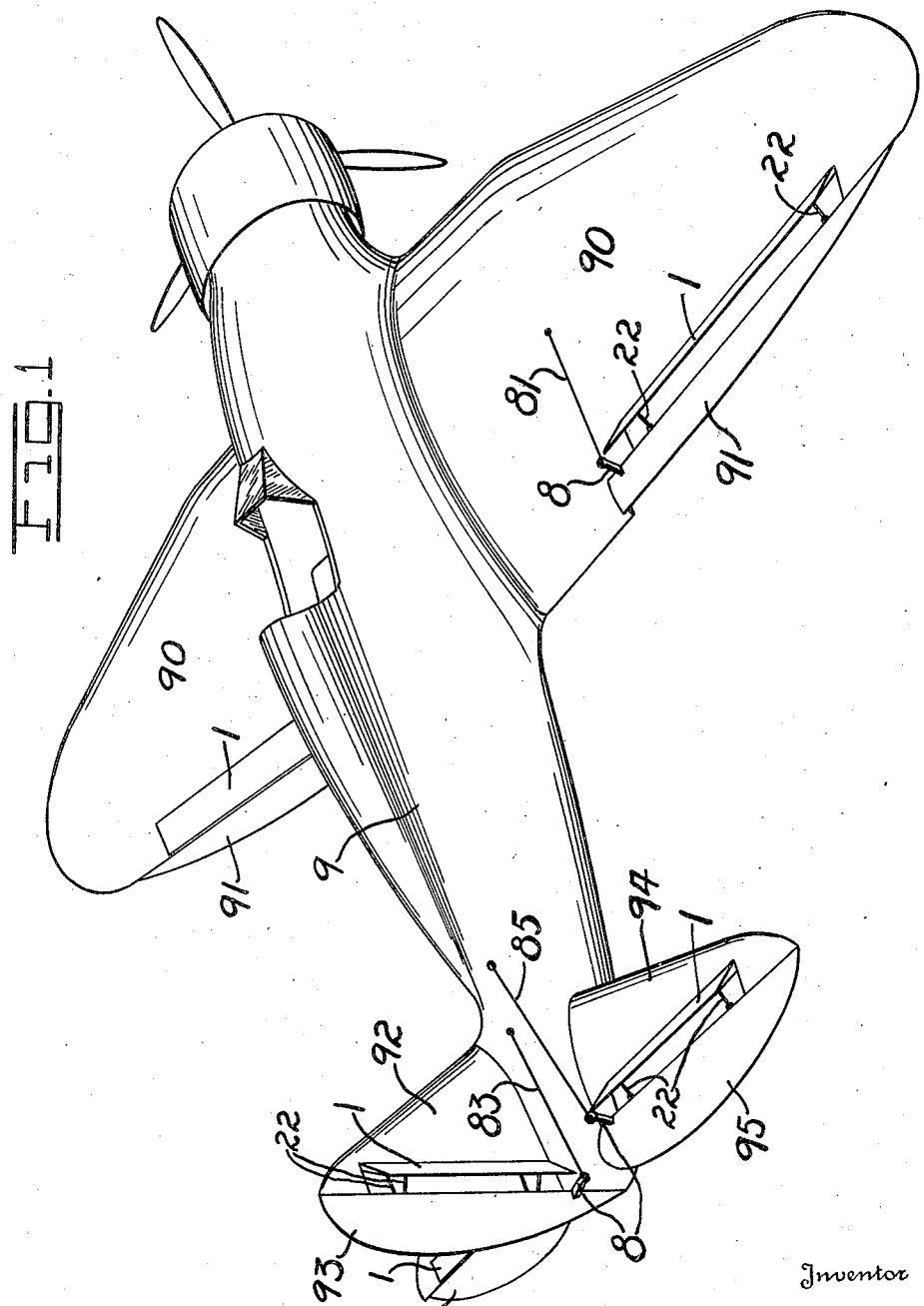

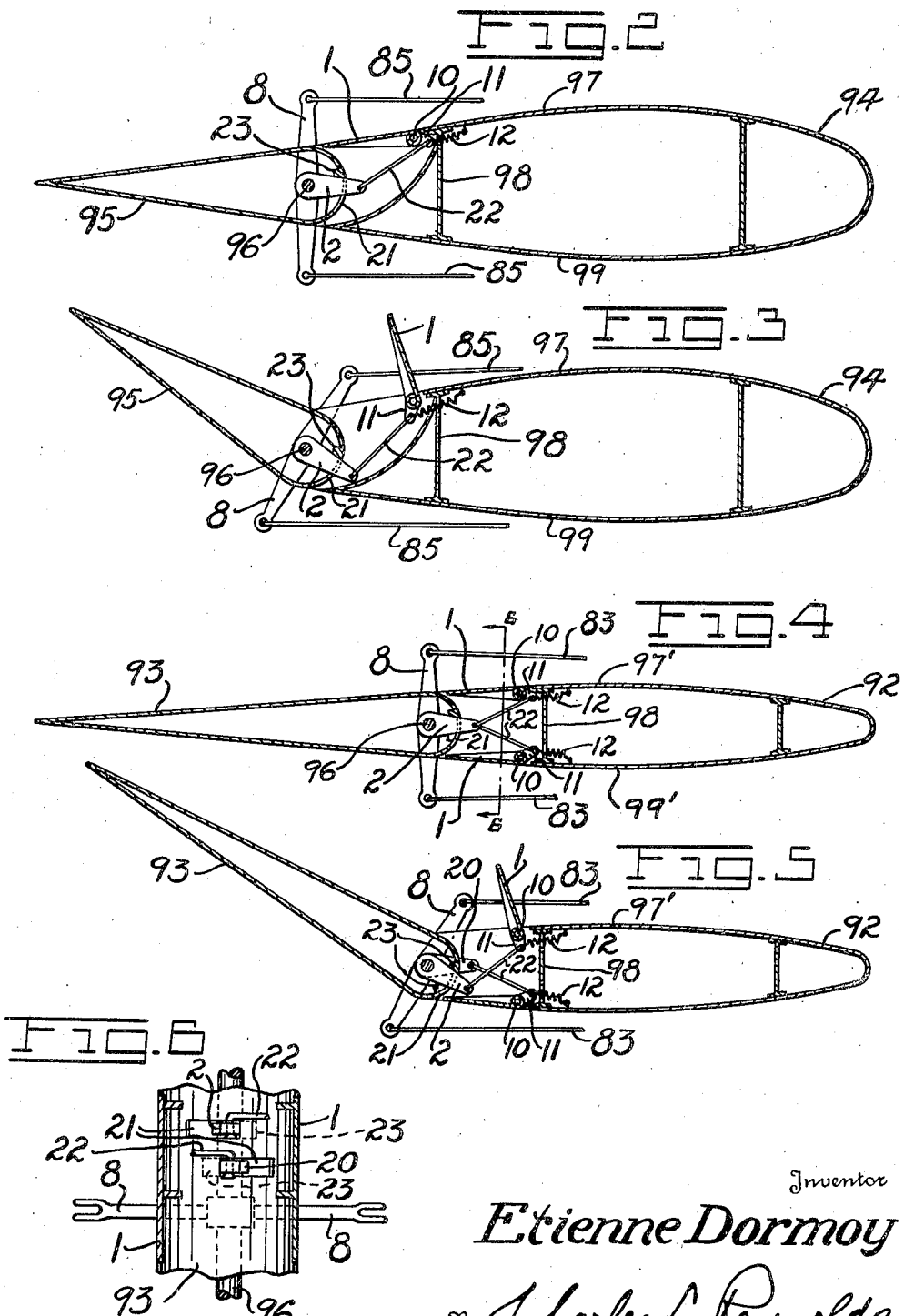

2,045,638

UNITED STATES PATENT OFFICE 2,045,638

MEANS TO ASSIST MOVEMENT OF AIRPLANE CONTROL SURFACES

Etienne Dormoy, Seattle, Wash., assignor to Boeing Aircraft Company, Seattle, Wash., a corporation of Washington Application December 18, 1934, Serial No. 758,049

16 Claims. (Cl. 244—29)

My invention relates to control surfaces for airplanes and like vehicles moving through a fluid medium, and more particularly to devices for assisting in the movement of such control surfaces in opposition to resisting hinge moments developed by wind pressure upon their departure from a neutral position.

It is a general object of my invention, then, to devise means for use in conjunction with normal control surfaces, in conjunction with fixed surfaces in advance thereof, which can be moved, usually automatically, upon movement of the control surface from its normal neutral position, into a position wherein it assists the movement of the control surface by shrouding a portion of the area of the control surface, deflecting the air, adjacent or in advance of the hinge axis of the control surface, and thereby relieving part of the pressure upon the pressure side of the control surface.

It is a further object to devise means of the type indicated, which shall be simple in construction and reliable in operation, and which can be automatically controlled, if desired, by the same controls which accomplish movement of the control surface.

It is a further object to devise such a connection between the two controls, or between the assisting surface and the assisted surface, that the deflection of one from a normal neutral position is proportionate to the deflection of the other, generally speaking.

My invention comprises the novel device and controls therefor, and the novel combination and arrangement thereof with respect to the movable and fixed control surfaces, all as shown in the accompanying drawings, and as will be more particularly defined by the claims, and as will be apparent as this specification progresses.

In the accompanying drawings I have shown my invention in association with various controls of an airplane, and in single and dual forms, but it will be evident that the invention may be incorporated in other ways, in relationship to controls of other vehicles than airplanes, for instance dirigibles, and that the structure and connections and control devices for the same may be widely varied, within the scope of the invention as defined by the claims.

Figure 1 is a perspective view of a typical airplane, embodying my invention as applied to the elevator, rudder and ailerons, with any one or more of which it may be associated.

Figure 2 is a diagrammatic cross section through a movable control surface, as the elevator, and a fixed control surface, as the stabilizer, having my invention incorporated therein in the single form, parts being shown in the normal neutral positions, and Figure 3 is a similar view showing the movable control surface swung at an angle to its neutral position, and the flap in a correspondingly swung position.

Figure 4 is a view similar to Figure 2, showing my invention incorporated in the dual form, as it might be applied to a rudder, and Figure 5 is a view similar to Figure 3 of this latter form.

Figure 6 is a vertical transverse section on the line 6—6 of Figure 4.

It will be understood that the neutral position, in flight, of a control surface such as the elevator, is not necessarily or usually one in which the chord of the elevator is in alignment with the chord of the stabilizer; rather, the elevator is usually dropped slightly. Accordingly, the term "neutral position" shall be understood as meaning, in this specification, that position wherein the chords approach alignment, or in some cases are aligned, to maintain substantially straight-line, level flight.

My invention is to be distinguished from balances which are sometimes formed as a rigid part of a movable control surface (which hereinafter, for purposes of convenience, will be designated the control surface), which balances normally project forwardly of the hinge axis of the control surface and which therefore swing to the opposite side of that toward which the control surface is swung, in that, according to my invention, there is a flap which is separate from and moves with the control surface, but to the same side as that towards which the control surface is swung. It is also to be distinguished from flaps of the type shown in the Tower Patent, No. 1,914,000, in which a separate flap is swung in the opposite direction from the control surface, but is mounted at the trailing edge of the control surface; in that, according to my invention, the flap is mounted adjacent to the hinge axis of the control surface, and preferably in advance of that axis. A flap so mounted, and being of less area and in some instances of less longitudinal extent than the control surface with which it is associated, has imposed on it by the pressure of the wind stream but a small portion of the pressure normally applied to the control surface, creating only a small hinge moment upon it, as compared to the hinge moment upon the control surface. Nevertheless, when swung outwardly in advance of the control surface, and on the pressure side thereof, by deflecting the air flowing over the fixed surface in advance of the control surface, it intercepts a considerable amount of pressure on and shrouds the control surface to a considerable extent, thereby reducing the hinge moment on the control surface itself, in that way facilitating departure of the control surface from its normal neutral position and its maintenance in or further departure from such altered position.

Figure 1 represents a typical airplane, comprising the fuselage 9, the sustaining wings 90, the ailerons 91, the fin or vertical stabilizer 92, the rudder 93, the horizontal stabilizer 94, and the elevator 95, with suitable controls for the various control surfaces. According to present practice the controls would normally be located inside the wings, stabilizer and fin, as the case may be, and inside the fuselage, but for convenience of illustration and clear understanding these controls have been shown as external, a horn 8 being shown connected to each of the control surfaces, and to this horn is connected a cable or rod or like element as 81, 83 and 85. These extend to the usual control devices (not shown) in the cockpit. In these respects the airplane and its controls does not or need not depart from the normal practice.

Since the invention may be incorporated in substantially the same manner with respect to each of the three usual controls—the ailerons, rudder and elevator—and operates substantially the same in connection with each of them, it will be convenient to describe it in conjunction with some one of them, for example the elevator.

In the single form, shown in Figures 2 and 3, the invention is illustrated in association with the elevator, for while it will usually be desirable to assist in swinging the elevator upward, it may not always be desirable or necessary to assist its downward swinging. The elevator 95 is shown as hingedly mounted at 96 at the trailing edge of the stabilizer 94. The skins 97 and 99 at opposite sides of the stabilizer are spaced apart at its rear edge, and these merge into the skin at opposite sides of the elevator, to form the usual smooth streamlined surface, with the elevator in neutral position. The elevator as shown is formed without any aerodynamic balance area forward of the hinge line. However, at one side of the elevator, in the single form, the skin 97 of the stabilizer stops short of the elevator, and across this space is mounted a flap 1. This is hingedly mounted at 10 at the forward edge of this gap, that is to say, at the rear edge of the skin 97. This flap is provided with an arm 11, which, when the flap is in its neutral position, shown in Figure 2, forming a smooth prolongation of the skin of the fixed surface, contacts with a stop, such as the flange of the beam 98, to prevent inward swinging of the flap from this position. A spring 12 serves to hold the flap in this position.

Loosely carried upon the hinge post 96 is an arm 2. The skin of the elevator at its forward edge is slotted at 21 to accommodate this arm 2, and the latter is connected by a link 22 to the arm 11. In the neutral position of the elevator 95 and flap 1 the arm 2 bears at one end of the slot 21, which is of a length in excess of the width of the arm 2, and this end of the slot may be reinforced, as indicated by the bar 23.

Now if the elevator is swung upward by its controls 83, the first movement of the elevator effects movement of the arm 2, and through the link 22 and arm 11 causes the flap 1 to swing outwardly at an angle to its neutral position, thereby to be moved into the wind stream in advance of the elevator. By suitable proportioning of the arms 2 and 11, and of the area and extent of the flap 1 with relation to the elevator, the flap will be caused to produce a shrouding of the upper or pressure side of the elevator to an extent which will very considerably reduce the resisting hinge moment, yet because of the leverage on the flap, no considerable effort will be caused by reason of the hinge moment on the flap; rather the total effort will be materially reduced.

Now, if it is not desired to assist swinging of the control surface to the opposite side, and only the single flap is employed, the swinging of the control surface to the opposite side will merely permit the arm 2 to remain stationary in the position shown in Figure 2, by reason of the extent of the slot 21.

If, however, it is desired to assist swinging of the control surface, the rudder, for instance, to each side of its neutral position, the dual form, shown in Figures 4 and 5, will be employed, flaps 1 being provided at the trailing edge of each skin 97' and 99' of the fin, and two arms, which to distinguish them are designated 2 and 20, are provided each in its respective slot 21, the slots being oppositely directed, so that when the rudder is swung to one side of neutral position, the flap on this side will be swung outwardly, but the opposite flap will remain in its neutral position, but upon swinging of the rudder to the opposite side the first flap will remain in its neutral position, and the flap on the opposite side, toward which the rudder is now swung, will be swung outwardly.

It is not outside the scope of my invention to employ the dual flaps for the elevator, or in such case to make the two flaps of different sizes, or otherwise differing in their effect, so that the lower flap has less effect on the elevator than the upper one, as the characteristics of the particular airplane may require. By making the two arms 2 or 11 of different lengths, at opposite sides of the control surface, their flaps can be swung different amounts, thereby giving a different effect on the control surface when swung to opposite sides of its neutral position.

It will be evident that the flap might take some other form, and might be moved otherwise than by a swinging motion, the essential fact being that with movement of the control surface an associated element is or may be projected into the wind stream to alter the effect of the wind stream on a portion, at least, of the pressure side of the control surface. It will also be evident that various connections and operating means might be employed to effect movement of such an element in the manner or to the end indicated.

What I claim as my invention is:

1. In combination with a fixed airfoil surface and a control surface hingedly mounted thereon, a flap mounted adjacent the hinge thereof and normally disposed in a position wherein it does not project into the airstream passing over such control surface, means to move said flap in response to movement of the control surface from its neutral position, into a position in such windstream, to lessen the hinge moment upon such control surface and means to close the gap between the fixed surface and the control surface when the control surface and the flap are thus moved.

2. In combination with a fixed airfoil surface and a movable aircraft control surface hinged thereto, a flap disposed immediately in advance of the major portion of such control surface, and normally disposed in a position wherein it does not project into the airstream passing over such surface, and means, operable in response to movement of the control surface from neutral position, to move the flap into a position to project within such windstream at one side of the control surface, to lessen the hinge moment upon such control surface when swung to that side, said fixed surface and said control surface cooperating to form an unbroken airfoil surface on the side thereof opposite said flap, when the control surface and flap are thus moved.

3. In combination with a fixed airfoil surface and a control surface movable relatively thereto, a flap mounted immediately in advance of the control surface and normally disposed in a position flush with the airfoil surface, means to move said flap to an angular position with respect to the fixed surface in response to movement of the control surface from its neutral position, to lessen the hinge moment upon such control surface, and means forming a continuous airfoil surface between the fixed and control surfaces on the side opposite that at which said flap is mounted.

4. In combination, a hinge mounting, an airplane control surface supported thereon and having a leading edge curved concentrically with said mounting, means to swing the same from a neutral position, means disposed immediately in advance of the control surface and operable in response to movement of the control surface from its neutral position, to lessen the hinge moment upon such control surface.

5. In combination, a hinge mounting, an airplane control surface supported thereon and having a leading edge curved concentrically with said mounting, means to swing the same from a neutral position means separate from and disposed immediately in advance of the control surface, and operable in response to departure of the control surface from its neutral position, to lessen the hinge moment upon such control surface.

6. In combination, a hinge mounting, an airplane control surface supported thereon and having a leading edge curved concentrically with said mounting, and means to swing the same from a neutral position, means adjacent to said hinge mounting operable in response to departure of the control surface from its neutral position to shroud a portion of the area thereof from the windstream.

7. In combination with a fixed airfoil surface, a control surface hinged thereon and movable from a neutral position for maneuvering the plane, controls for effecting such movement, a flap overlying the rear portion of said fixed airfoil surface, normally disposed in a flush position adjacent the hinge axis of the control surface, and means operable by and from said controls to swing the flap into the wind stream, as the control surface departs from its neutral position, into a position to partially shroud the pressure side of the control surface.

8. In combination with a hinged control surface of an airplane, normally disposed in a neutral position, a flap disposed adjacent to its hinge axis, the surfaces of the control surface and flap forming a single smooth streamlined surface on each side thereof, with both in their neutral positions, means to swing the control surface to one side of its neutral position, means operable in response to such movement of the control surface to move the flap outwardly from its neutral position at an angle to the windstream, upon the side to which the control surface is swung, to shroud a portion of the control surface, and to leave a gap between the flap and the leading edge of the control surface, and means closing said gap when said flap is thus moved.

9. In combination with a fixed airfoil surface, a hinged control surface, normally disposed in a neutral position, a flap disposed adjacent its hinge axis, and of less surface area than the control surface, the surfaces of the flap and the control surface forming a single smooth streamlined surface, with both in their neutral position, means to swing the control surface to one side of its neutral position, said fixed surface and said control surface forming a smooth and unbroken airfoil surface on the other side, and means operable in response to such movement of the control surface to move the flap outwardly from its neutral position into a position at the same side and at an angle to the windstream, and in advance of the control surface, to shroud a portion of the control surface.

10. In combination with a hinged airplane control surface having skins spaced apart at opposite sides of its hinge axis, and normally disposed in a neutral position, two flaps disposed immediately in advance of such hinge axis and at opposite sides thereof, and normally in prolongation of the respective skins of the control surface, controls to swing the control surface to either side of its neutral position, and means operable by such controls to move that flap on the side towards which the control surface is moved, into a position projecting at this side angularly from its neutral position, to shroud a portion of the pressure side of the control surface.

11. In an airplane, in combination with a fixed control surface, for example, a fin, and a movable control surface hingedly mounted on its trailing edge, for example, a rudder, the skin of the fin at one side terminating in advance of the skin of the rudder, a flap hingedly mounted at the trailing edge of the fin skin, at this side, and normally lying in prolongation of the streamline surfaces of the fin and rudder, when the latter is in its neutral position, controls for swinging the rudder, means operable by said controls to swing the trailing edge of the flap outwardly when the rudder is swung to this side, and means at the opposite side cooperating with the fin and the rudder to form a smooth unbroken surface.

12. The combination of claim 11, wherein the last means is a second flap similarly mounted and controlled, at the trailing edge of the opposite skin of the fin, the flap-swinging means including a lost-motion device to effect outward swinging of each flap only when the rudder is swung to its side of the neutral position the other flap smoothly filling the gap between the fin and the rudder.

13. In an airplane, in combination with a fixed airfoil surface and a control surface hinged thereto, for example, an elevator, controls for swinging the same, a flap hingedly mounted immediately in advance of the hinge axis of the elevator, and in neutral position lying in forward prolongation of the skin at one side of the elevator, means to hold the flap in such neutral position, and yieldable to permit outward swinging thereof, and means received entirely between the airfoil surfaces formed jointly by said fixed and control surfaces, and movable by said controls to swing the flap outwardly when the elevator is swung to the same side of the neutral position.

14. In an airplane, in combination with a fixed airfoil surface and a control surface hinged thereto, for example, an elevator, controls for swinging the same, a flap hingedly mounted immediately in advance of the hinge axis of the elevator, and in neutral position lying in forward prolongation of the skin at one side of the elevator, means to hold the flap in such neutral position, and yieldable to permit outward swinging thereof, and means continuously received entirely between the airfoil surfaces formed jointly by said fixed and control surfaces, and movable by said controls to swing the flap outwardly when the elevator is swung to the same side of the neutral position, said means being so proportioned and connected as to swing the flap through a greater angular extent than the elevator.

15. In an airplane, in combination with a fixed airfoil surface and a control surface hinged thereto, for example, a rudder, having a leading edge curved concentrically with said hinge axis, controls for swinging the same, a flap hingedly mounted immediately in advance of the hinge axis of the rudder, and in neutral position lying in forward prolongation of the skin at one side of the rudder, a spring and stop means cooperating to hold the flap in such neutral position, an arm associated with the rudder control and projecting forwardly between the rudder surfaces, a second arm carried by the flap, and disposed entirely between rearward projections of the fixed airfoil surfaces, and a link connecting said arms, and disposed entirely between rearward projections of the fixed airfoil surfaces, to swing the flap outwardly from its neutral position into the windstream when the rudder is swung towards this side.

16. In combination with a fixed airfoil surface, a control surface hinged thereon and swingable from a neutral position in prolongation of the fixed surface into operative positions at angles to such fixed surface, said fixed surface and said control surface always, both in neutral and in operative positions of said control surface, cooperating to form a substantially unbroken airfoil, a flap mounted adjacent to the control surface hinge, and disposed, in neutral position, not projecting into the air stream passing over said control surface, and means, operable in response to movement of the control surface from neutral position, to move the flap into a position projecting into the air stream flowing over that side of said control surface toward which the control surface was swung.

ETIENNE DORMOY.